June 27, 1967 — H. W. LINK — 3,327,795
RAISABLE PLATFORM WEIGHING DEVICE
Filed July 7, 1966 — 2 Sheets-Sheet 1
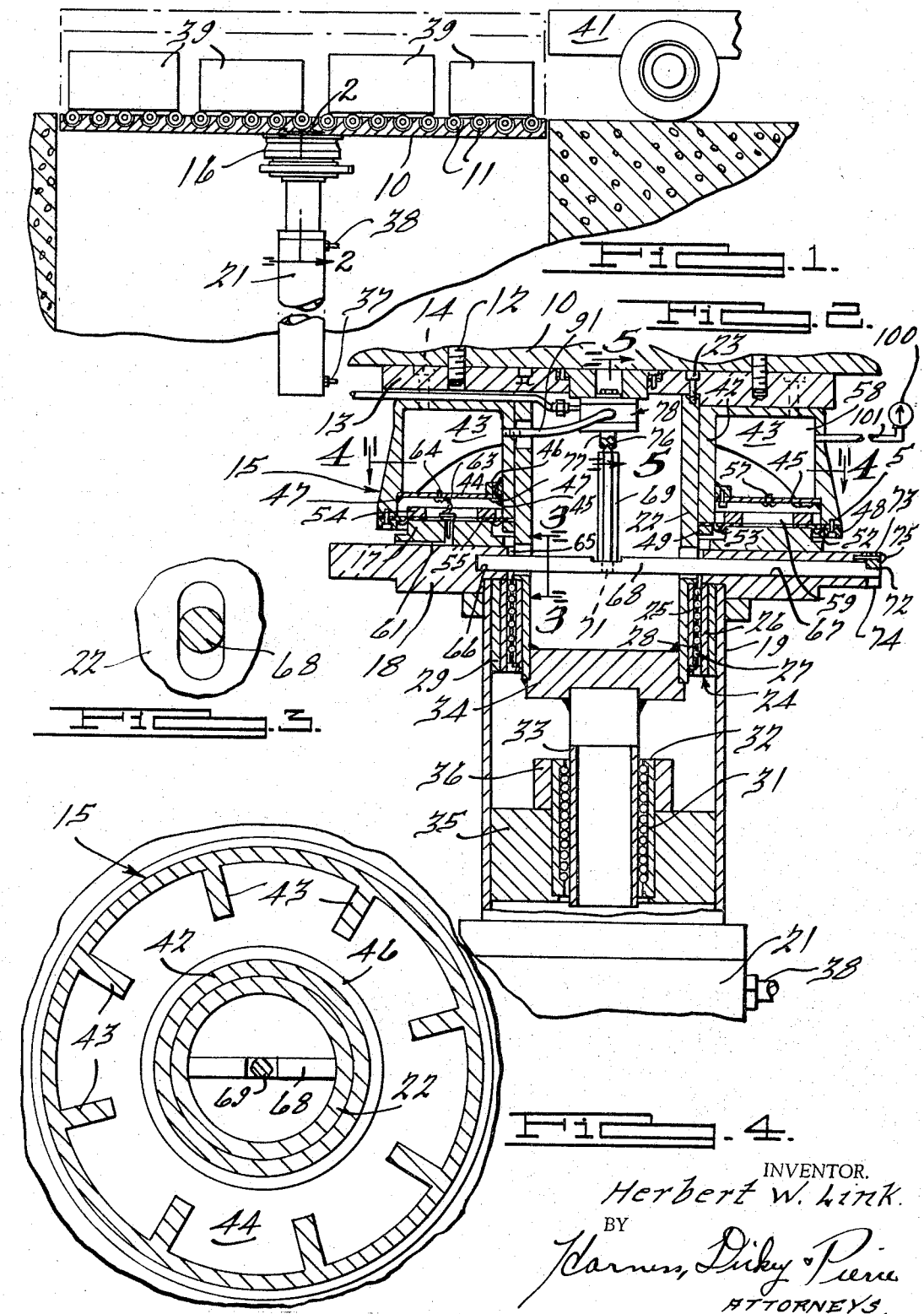
INVENTOR.
Herbert W. Link.
BY
Karnes, Dickey & Pierce
ATTORNEYS.

June 27, 1967  H. W. LINK  3,327,795
RAISABLE PLATFORM WEIGHING DEVICE
Filed July 7, 1966  2 Sheets-Sheet 2
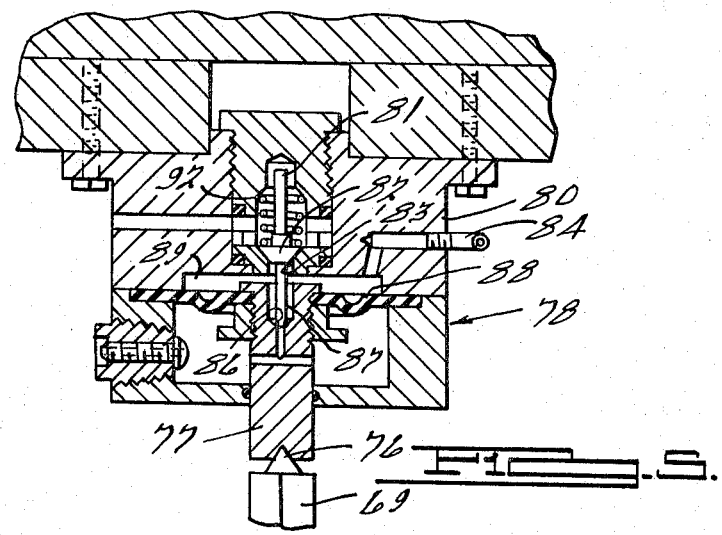
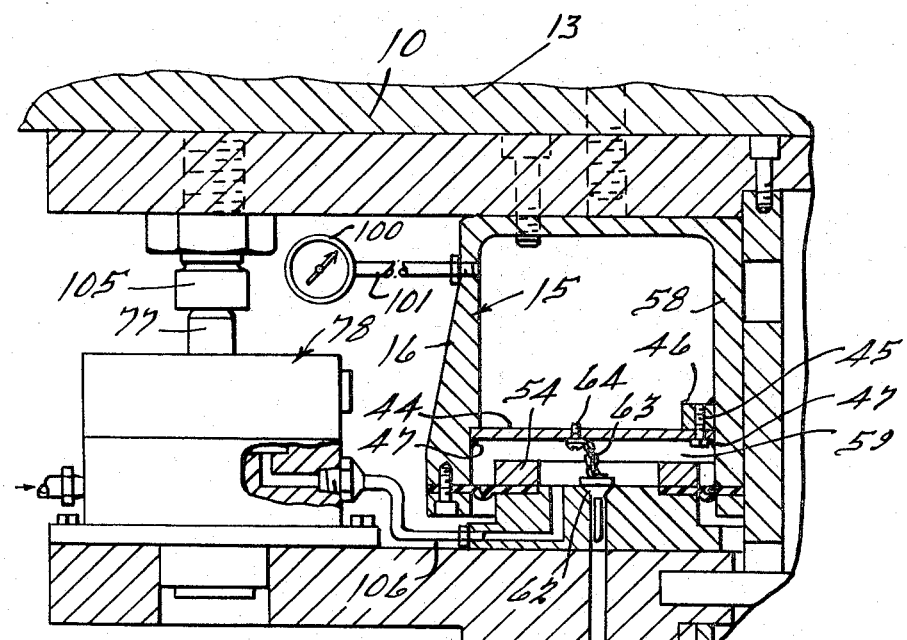
INVENTOR.
Herbert W. Link
BY
Harness, Dickey & Pierce
ATTORNEYS.

# United States Patent Office 3,327,795
RAISABLE PLATFORM WEIGHING DEVICE
Herbert W. Link, 8330 Sorrento,
Detroit, Mich. 48227
Filed July 7, 1966, Ser. No. 563,433
10 Claims. (Cl. 177—208)

ABSTRACT OF THE DISCLOSURE

The invention pertains to a large weighing platform mounted on an air responsive device which is supported on a reciprocal piston rod by means which prevents the platform from tilting when loaded unevenly.

SUMMARY OF THE INVENTION

This invention relates to weighing devices and particularly to a device for weighing articles placed upon an elevatable platform.

The weighing device of the present invention embodies an air cell made of a stationary and movable part sealed together to have the movable part supported on air contained in the chamber formed thereby. A platform is mounted on the movable part of the cell on which articles to be weighed may be placed. A cylindrical sleeve extends through the center of the cell and rides on ball bearings supported within a cylindrical piston rod. The piston rod supports additional ball bearings which are engaged by a stem extending downwardly from the cylindrical sleeve which rides on bearings thereabout. The two sets of bearings resist the tilting of the platform and accurate indications of weight are obtained irrespective of where the articles being weighed are located thereon. The piston rod extends downwardly into a cylinder having fluid conduits at the bottom and top with a piston therebetween for the purpose of raising the platform to the height of a vehicle bed so that the articles weighed on the platform can be advanced thereonto. Preferably, the surface of the platform is provided with rollers which permits the ready movement of the articles therefrom onto the bed.

Accordingly, the main objects of the invention are: to mount a platform on a weighing cell which is guided on spaced sets of ball bearings which resist tilting while eliminating friction to assure a correct weight; to mount a platform on a weighing cell which is supported on a piston rod in a cylinder by which the cell and platform are raised to align the platform with the bed of a truck so that the articles after being weighed may be moved thereonto; to provide rollers on a platform mounted on a weighing cell supported on a piston rod in the cylinder which permits articles to be advanced into a truck body after being weighed and after the platform is raised in alignment therewith, and in general, to provide a weighing device which is simple in construction, positive in operation, economical of manufacture.

Other objects and features of novelty of the invention will be specifically pointed out or will become apparent when referring, for a better understanding of the invention, to the following description taken in conjunction with the accompanying drawings, wherein:

FIGURE 1 is a broken sectional view of an elevatable weighing platform embodying features of the present invention;

FIG. 2 is an enlarged broken sectional view of the structure illustrated in FIG. 1, taken on the line 2—2 thereof;

FIG. 3 is a broken sectional view of the structure illustrated in FIG. 2, taken on the line 3—3 thereof;

FIG. 4 is a broken sectional view of the structure illustrated in FIG. 2, taken on the line 4—4 thereof;

FIG. 5 is an enlarged broken view of the structure illustrated in FIG. 4, taken on the line 5—5 thereof, and FIG. 6 is a view of structure similar to that illustrated in FIG. 2, showing another form the invention may assume.

The present invention is an improvement of the supporting and weighing device illustrated, described and claimed in the patent to Herbert W. Link, 3,177,958. In the present arrangement a platform 10 of substantial length and breadth has a plurality of transversely disposed rollers 11 supported thereon for rotation relative thereto. As illustrated in FIG. 2, the platform 10 is secured by a plurality of bolts 12 to a mounting plate 13 secured by bolts 14 to a movable element 15 of a weighing unit 16. A fixed element 17 of the weighing unit 16 is secured to a plate 18 which is supported by a tubular piston rod 19 having a piston-like end sealed within a cylinder 21.

A cylindrical sleeve 22 is secured by screws 23 to the plate 13 to move with the element 15 of the weighing unit 16. An annular bearing element 24 is made up of an inner ring 25 and an outer ring 26 engaged by a plurality of balls 27 which are mounted in apertures in an annular cage 28 disposed between the rings 25 and 26. The inner race 25 rests in an annular recess at the bottom of the sleeve 22 and the outer race 26 engages an annular ring 29 secured to the inner face of the tubular piston rod 19. The bearing permits the movement between the sleeve 22 and piston rod 19 and prevents friction occurring therebetween in case a load is placed off center at one end of the platform 10. The platform is further stabilized by the vertically running balls 31 mounted in a cage 32 which permits the vertical movement of a stem 33 attached to a plug 34 which is welded or otherwise secured to the bottom end of the sleeve 22. The ball race 32 is mounted in an aperture within a pair of collars 35 and 36 secured within the tubular piston rod 19. The balls in the cage 32 permit the vertical movement of the stem 33 without friction while resisting deflection in case a load is offset on the platform 10. As an example, a 1500 pound load was placed on the platform 5 feet from the center and a 5 pound load was placed adjacent to the center and the added 5 pounds was registered accurately on the weighing mechanism.

The tubular piston rod 19 and the cylinder 21 are similar to those used by a garage for the rack employed to raise an automobile. The piston rod is raised when fluid is admitted to the lower conduit 37 which expels the fluid from the upper conduit 38. In this way the weighing unit 16 and platform 10 are raised to permit the articles 39 which have been disposed and weighed on the platform to be moved on the rollers 11 from the platform 10 onto the bed 41 of a truck which has been backed to a position to receive the articles. With this arrangement a fork lift truck deposits the articles directly on the platform which are weighed individually or as a group, and after a load has been assembled on the platform it is raised and the articles are then moved onto the bed of the truck, as pointed out hereinabove.

The movable element 15 of the weighing unit 16 is of inverted pan shape having a cylindrical wall 42 defining a central aperture in which the sleeve 22 is secured. A plurality of ribs 43 are provided within the element 15 to add strength thereto. A washer-like partition 44 is disposed within the element adjacent to the open end thereof. The partition is secured by screws 45 to a ring 46 on the wall 42 and to the outer edge of the ribs 43. The inner and outer edges of the partition 44 are sealed to the adjacent walls by epoxy resin or similar sealing material 47. The ends of the element 15 and the cylindrical wall 42 have a ring 48 and 49 respectively secured thereto by screws 51 for clamping one edge of flexible washer-like sealing diaphragms 52 and 53 thereto. The opposite edges of the diaphragms are secured by rings 54 and 55 to the edges of the fixed element 17 which is attached to the plate 18. The flexible diaphragms 52 and 53 seal the movable element 15 to the fixed element 17 while permitting relative movement therebetween.

The partition 44 has an aperture containing a screw 57 which has a bleed orifice therethrough for controlling the flow of air from the chamber 58 above the partition 44 to a chamber 59 therebelow. The chamber 59 has a passageway 61 extending to atmosphere being sealed by a valve 62 having a chain 63 connected to the partition 44 by a screw 64. Should the platform move upwardly beyond a desired amount, the chain will raise the valve 62 and permit the air in the chamber 59 to escape to atmosphere and prevent damage to the unit.

The plate 18 has a central aperture 65 and diametrically located aligned apertures 66 and 67 for receiving and supporting a rod 68 to which a finger 69 is located on the center of the aperture 65 and secured by a threaded end 71. The outer end of the rod has a diametrical flat portion 72 which is engaged by the bottom face of a block 73 accurately guided in a milled slot 74 and secured in position by a screw 75. This positions the finger 69 exactly on the center line of the weighing device 16 with a conical end 76 engaging a conical aperture in a piston rod 77 of a control device 78. The device 78 is substantially the same as that shown and described in the aforementioned patent and consists of a housing 80 provided with a valve stem 81 having a valve part 82 adapted to normally close a port 83 interposed in the air inlet 84. The piston rod 77 is provided with an exhaust valve seat 86 which is controlled by the end 87 of the valve stem 81. The piston rod 77 is connected to a diaphragm 88 which defines a chamber 89 within the housing 80. This chamber is connected by a conduit 91 to the interior of the movable element 15. A spring 92 normally holds the valve in the position illustrated in FIG. 5.

When a load on the platform 10 is increased, the movable element 15 and device 78 will be depressed while the piston rod is retained stationary along with the valve stem 81 and valve part 82. This opens the port 83 to permit an additional supply of air under pressure to flow from the chamber 89 through the conduit 91 into the movable element 15 to counteract the increase in the load. When the load is lightened, and the load supporting platform rises above its normal level, the air in the chamber 89 will hold the piston rod 77 against the end 76 as the stem 81 moves upwardly separating the end 87 from the seat 86 to permit the air to escape from the movable element 15 and the load supporting platform to return to its normal position. The pressure of air in the system can be measured by a gauge 100 connected by a conduit 101 to the chamber 58. The dial is preferably calibrated to indicate in pounds the load placed upon the platform 10. The use of the ball bearings one above the other on the movable support for the weighing unit prevents the tilting of the platform and binding against vertical movement and in this way an accurate weight is obtained of an article placed at any point on the platform which moves upwardly or downwardly without restraint.

FIG. 6 is a disclosure of the same structure as that illustrated in FIG. 1 with the exception that the control device 78 is mounted outside of the weighing unit 16 instead of in the center thereof. The piston rod 77 abuts a screw 105 which is carried by the plate 13. The movement of the plate 13 upwardly or downwards moves the piston rod 77 to release the pressure in the chambers 59 and 59 or to add air thereto to maintain the plate 13 at a normal position. The air passes from and to the chamber 59 through a conduit 106 as clearly illustrated in the figure. The air passes between the chambers 58 and 59 through the hole in the screw 57.

The devices function in the same manner and meet a long-felt need in the art of handling and weighing articles before shipment. The articles are directly moved to a loading platform where they are deposited, weighed and when sufficient articles have been collected, raised and moved from the platform into the bed of a vehicle. This eliminates the multiple handling of the articles by the lift trucks which heretofore placed them on a scale, removed them from the scale, transported them to a platform from which they were loaded on the platform of a truck. The present devices substantially reduce the cost of weighing and handling articles for shipment and substantially reduce the time required for weighing and delivering the articles to the truck body.

What is claimed is:

1. In a weighing device, a platform, a pressure device having a movable and stationary part forming a chamber containing air, means for supporting the platform on the movable part of the device, a piston rod means for supporting the stationary part of said pressure device on said piston rod, a cylinder for advancing and retracting said piston rod for raising and lowering said platform and device, and means carried by the platform in engagement with the piston rod for preventing the platform from tilting.

2. In a weighing device recited in claim 1, wherein flexible sealing means joining said parts, and wherein said means for preventing tilting is a support extending into the piston rod, a bearing element between the support and said piston rod, an extension below said support, and a bearing member between said extension and said piston rod.

3. In a weighing device as recited in claim 2, wherein said platform extends a substantial distance each side of said pressure device and said bearing elements prevent friction occurring upon relative movement of the platform and piston rod.

4. In a weighing device as recited in claim 1, wherein said stationary and movable parts are joined by flexible sealing means, means for admitting air into the chamber formed by said parts, a central support for said pressure device, and bearing means engaging said support one located above the other to prevent tilting of said platform when an offset load is applied to the platform.

5. In a weighing device as recited in claim 1, wherein a valve device is responsive to the relative movement between stationary and movable parts of the pressure device for controlling the flow of fluid to and from said device.

6. In a weighing device described in claim 5, wherein said valve device is mounted on the central axis of the pressure device.

7. In a weighing device as recited in claim 5, wherein said valve device for controlling the in or out flow of air to said pressure device is mounted exteriorly of the pressure device between the fixed and movable parts thereof.

8. In a weighing device as recited in claim 5, wherein valve means is provided which opens the pressure device to atmosphere when too great a separation occurs between the stationary and movable parts of the device.

9. In a weighing device as recited in claim 1, wherein valve means are responsive to the movement between the platform and piston rod for controlling the flow of air to and from the chamber.

10. In a weighing device as recited in claim 5, wherein the valve device is mounted on the center of the movable part of the pressure device, a movable rod extending downwardly from the valve means, and stationary means carried by said stationary part engaging said movable rod.

References Cited

UNITED STATES PATENTS

| | | | |
|---|---|---|---|
| 2,819,612 | 1/1958 | Borgstrom et al. | 177—134 X |
| 2,909,367 | 10/1959 | Goehrig, et al. | 177—146 |
| 3,177,958 | 4/1965 | Link | 177—208 |

RICHARD B. WILKINSON, *Primary Examiner.*

G. H. MILLER, *Assistant Examiner.*